United States Patent
Ishihara

(10) Patent No.: US 11,263,456 B2
(45) Date of Patent: Mar. 1, 2022

(54) VIRTUAL OBJECT REPOSITIONING VERSUS MOTION OF USER AND PERCEIVED OR EXPECTED DELAY

(71) Applicant: SONY CORPORATION, Tokyo (JP)

(72) Inventor: Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/757,974

(22) PCT Filed: Aug. 9, 2018

(86) PCT No.: PCT/JP2018/029985
§ 371 (c)(1),
(2) Date: Apr. 21, 2020

(87) PCT Pub. No.: WO2019/087513
PCT Pub. Date: May 9, 2019

(65) Prior Publication Data
US 2020/0342229 A1    Oct. 29, 2020

(30) Foreign Application Priority Data

Oct. 31, 2017    (JP) .............................. JP2017-210820

(51) Int. Cl.
| | | |
|---|---|---|
| G06K 9/00 | (2006.01) | |
| G06T 7/90 | (2017.01) | |
| G06T 7/20 | (2017.01) | |
| G06T 19/00 | (2011.01) | |

(52) U.S. Cl.
CPC ............ *G06K 9/00671* (2013.01); *G06T 7/20* (2013.01); *G06T 7/90* (2017.01); *G06T 19/006* (2013.01)

(58) Field of Classification Search
None
See application file for complete search history.

(56) References Cited

U.S. PATENT DOCUMENTS

| | | | |
|---|---|---|---|
| 10,169,919 B2 * | 1/2019 | Schillings | ................ G08B 5/36 |
| 2014/0240552 A1 | 8/2014 | Kasahara | |
| 2016/0247324 A1 * | 8/2016 | Mullins | ............. G02B 27/0179 |

FOREIGN PATENT DOCUMENTS

| | | |
|---|---|---|
| CN | 103907139 A | 7/2014 |
| EP | 3352050 A1 | 7/2018 |
| JP | 2009-025918 A | 2/2009 |
| JP | 2012-221250 A | 11/2012 |
| JP | 2013-105285 A | 5/2013 |

(Continued)

OTHER PUBLICATIONS

International Search Report and Written Opinion of PCT Application No. PCT/JP2018/029985, dated Oct. 23, 2018, 09 pages of ISRWO.

*Primary Examiner* — Edward Martello
(74) *Attorney, Agent, or Firm* — Chip Law Group

(57) ABSTRACT

Provided is an information processing device that includes a position acquisition section that acquires a position of a virtual object in a real space, having been determined on the basis of a recognition result of a real space corresponding to an image captured by an imaging device, and a display control section that controls display of at least a boundary of the virtual object, on the basis of the position of the virtual object, and a feature of a real object that resides in the real space and is away from the position of the virtual object.

18 Claims, 13 Drawing Sheets

(56) References Cited

FOREIGN PATENT DOCUMENTS

| | | |
|---|---|---|
| JP | 2014-182719 A | 9/2014 |
| WO | 2013/069196 A1 | 5/2013 |
| WO | 2017/047178 A1 | 3/2017 |
| WO | 2017/183346 A1 | 10/2017 |

* cited by examiner

FIG.6

| VIRTUAL OBJECT | PREDICTED STRENGTH OF FEELING OF DELAY IN DISPLAY |
|---|---|
| 30-31 ABC | 1.0 |
| 30-32 ABC | 0.9 |
| 30-33 ABC | 0.7 |

FIG.7

| VIRTUAL OBJECT | PREDICTED STRENGTH OF FEELING OF DELAY IN DISPLAY |
|---|---|
| 30~34 | 0.4 |
| 30~35 | 0.35 |
| 30~36 | 0.25 |

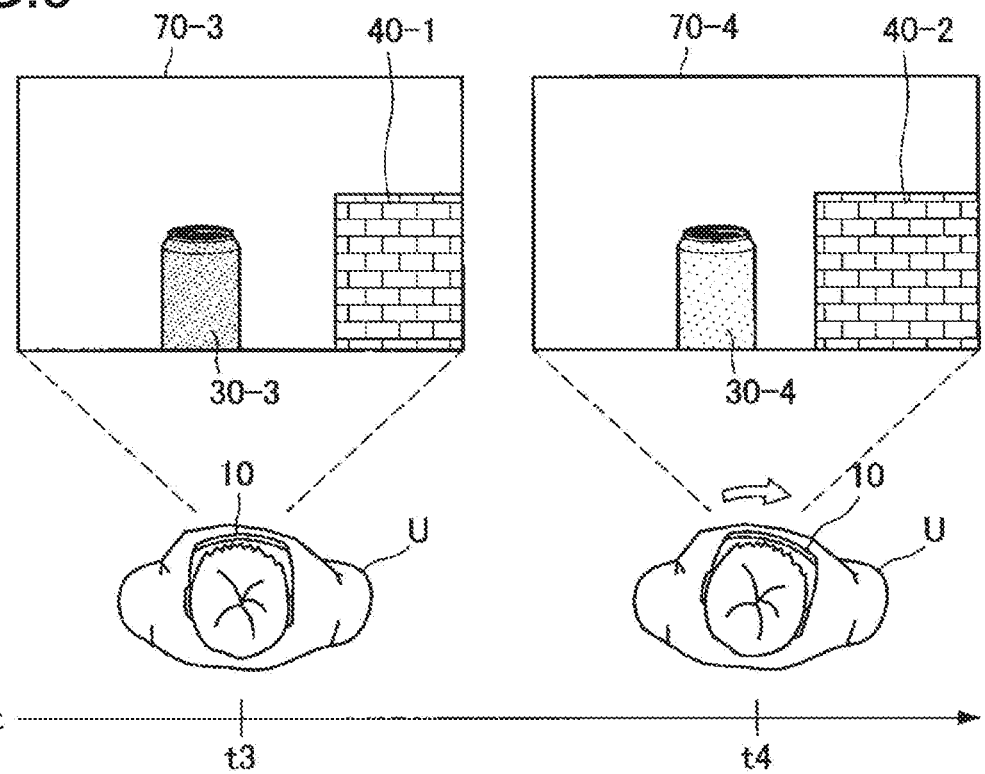

VIRTUAL OBJECT REPOSITIONING VERSUS MOTION OF USER AND PERCEIVED OR EXPECTED DELAY

CROSS REFERENCE TO RELATED APPLICATIONS

This application is a U.S. National Phase of International Patent Application No. PCT/JP2018/029985 filed on Aug. 9, 2018, which claims priority benefit of Japanese Patent Application No. JP 2017-210820 filed in the Japan Patent Office on Oct. 31, 2017. Each of the above-referenced applications is hereby incorporated herein by reference in its entirety.

FIELD

The present disclosure relates to an information processing device, an information processing method, and a program.

BACKGROUND

A technology for presenting a virtual object to a user has recently been disclosed. For example, having been disclosed is a technology regarding an image processing device that includes a recognition section that recognizes a position or attitude of an object seen in an image, and a display control section that modifies display of a virtual object relevant to the object, depending on the degree of stability of recognition by the recognition section (see Patent Literature 1, for example). With such technology, the user is prevented from being confused by distortion of display of the virtual object.

Meanwhile, there may be delay in display of the virtual object, besides the distorted display of the virtual object. Moreover, besides the delay in display, there resides a concept regarding to what degree the user can recognize the delay in display of the virtual object. Such recognizability of the delay in display by the user will be referred to as "feeling of delay in display", hereinafter.

CITATION LIST

Patent Literature

Patent Literature 1: JP-A-2012-221250

SUMMARY

Technical Problem

It is now anticipated that the stronger the feeling of delay in display of the virtual object would be, the stronger the feeling of wrongness regarding the delay in display of the virtual object would be. Meanwhile, it is also anticipated that the more largely the display of the virtual object is modified, the more the recognizability of the virtual object would degrade. Hence, there has been awaited a technology capable of reducing the feeling of wrongness in display of a virtual object, while suppressing recognizability of the virtual object from degrading.

Solution to Problem

According to the present disclosure, an information processing device is provided that includes: a position acquisition section that acquires a position of a virtual object in a real space, having been determined on the basis of a recognition result of the real space corresponding to an image captured by an imaging device; and a display control section that controls display of at least a boundary of the virtual object, on the basis of the position of the virtual object, and a feature of a real object that resides in the real space and is away from the position of the virtual object.

According to the present disclosure, an information processing method is provided that includes: acquiring a position of a virtual object, having been determined on the basis of a position of a virtual camera having been calculated on the basis of recognition result of a real space corresponding to an image captured by an imaging device; and controlling display of at least a boundary of the virtual object, on the basis of the position of the virtual object, and a feature of a real object that resides in the real space.

According to the present disclosure, a program is provided that functionalizes a computer as an information processing device, the information processing device includes: a position acquisition section that acquires a position of a virtual object, having been determined on the basis of a position of a virtual camera having been calculated on the basis of recognition result of a real space corresponding to an image captured by an imaging device; and a display control section that controls display of at least a boundary of the virtual object, on the basis of the position of the virtual object, and a feature of a real object that resides in the real space.

Advantageous Effects of Invention

As described above, the present disclosure can provide a technology capable of reducing feeling of wrongness in display of a virtual object, while suppressing recognizability of the virtual object from degrading. Note that the aforementioned effects are not always restrictive, instead allowing demonstration of, together with or alternatively to the aforementioned effects, any of effects illustrated in this specification, or some other effect possibly understood from this specification.

BRIEF DESCRIPTION OF DRAWINGS

FIG. 6 is a chart summarizing exemplary virtual objects, and predicted strengths of feeling of delay in display correlated to the virtual objects.

FIG. 7 is a chart summarizing exemplary virtual objects, and predicted strengths of feeling of delay in display correlated to the virtual objects.

FIG. 8 is a chart summarizing exemplary virtual objects, and predicted strengths of feeling of delay in display correlated to the virtual objects.

FIG. 9 is a drawing illustrating an exemplary modification of color of the virtual object.

DESCRIPTION OF EMBODIMENTS

Preferred embodiments of the present disclosure will be detailed below, referring to the attached drawings. Note that, throughout the present specification and the drawings, all constituents having substantially same functional configurations will be given the same reference signs, so as to avoid repetitive explanations.

Also note that, throughout the present specification and the drawings, a plurality of constituents having substantially same or similar functional configurations will occasionally be given the same reference signs followed by different numerals for discrimination. Note, however, that the constituents having substantially same or similar functional configurations will be given the same reference signs only, if there is no special need for discrimination among them. All constituents that are similar but in different embodiments will occasionally be given the same reference signs followed by different alphabets. Note, however, that the similar constituents will be given the same reference signs only, if there is no special need for discrimination among them.

The description will be given in the order below.

0. Overview
1. Details of Embodiments
1.1. Exemplary Functional Configuration of Information Processing Device
1.2. Detailed Functions of Information Processing Device
1.3. Exemplary Operations of Information Processing Device
2. Exemplary Hardware Configuration
3. Conclusion

0. OVERVIEW

Figure 1:
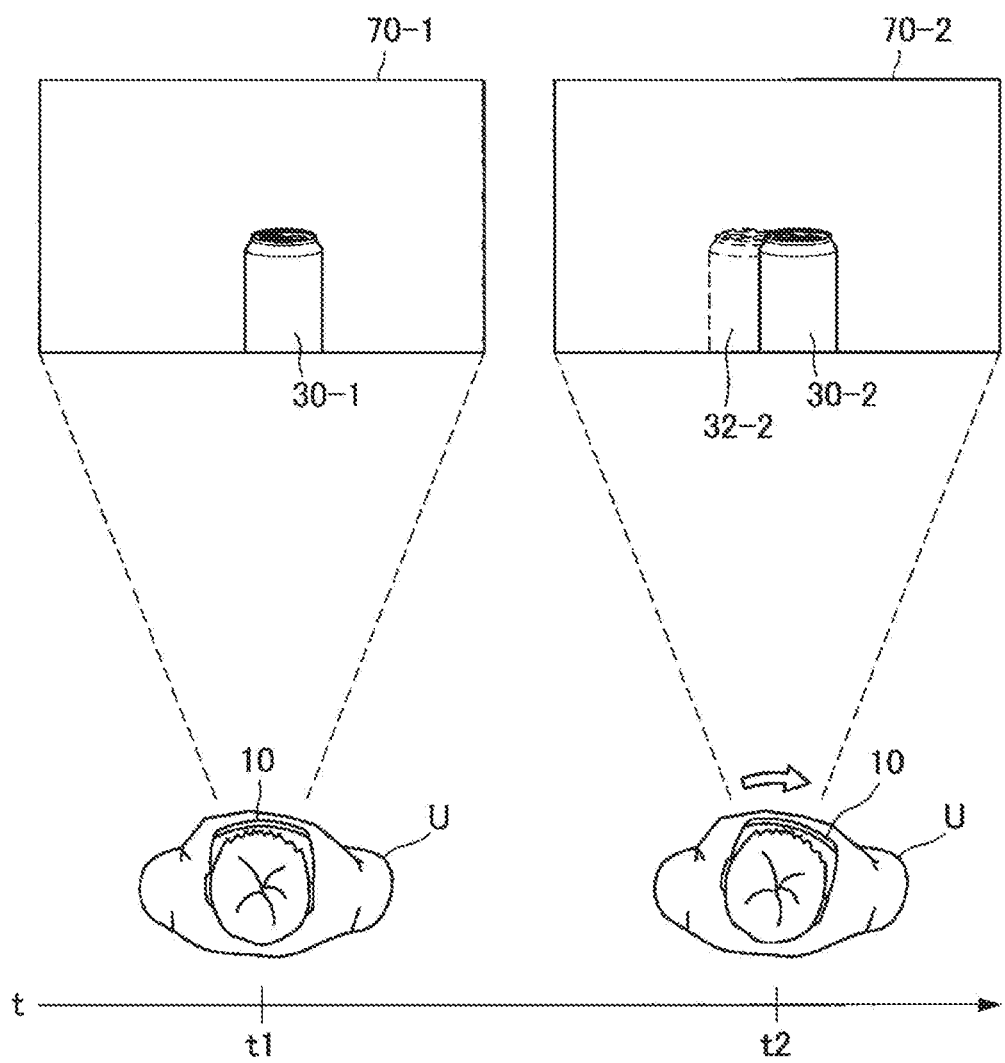
FIG. 1 is a drawing illustrating an overview of an embodiment of the present disclosure.

First, embodiments of the present disclosure will be outlined, referring to FIG. 1. A technology for presenting a virtual object to a user has recently been disclosed. For example, having been disclosed is a technology regarding an image processing device that includes a recognition section that recognizes a position or attitude of an object seen in an image (real object), and a display control section that modifies display of a virtual object relevant to the object, depending on the degree of stability of recognition by the recognition section. With such technology, the user is prevented from being confused by distortion of display of the virtual object.

Meanwhile, there may be delay in display of the virtual object, besides the distorted display of the virtual object. This will be detailed referring to FIG. 1. FIG. 1 is a drawing illustrating an overview of an embodiment of the present disclosure. As seen in FIG. 1, a user U resides in a real space. At time t1, a virtual object 30-1 is arranged in the field of view 70-1 of the user U.

When the virtual object 30-1 is presented to the user U, a position and attitude (position of a virtual camera) of an imaging section for field-of-view analysis 111 (FIG. 5) is recognized, on the basis of sensing data obtained by the imaging section for field-of-view analysis 111 (FIG. 5) (for example, stereo camera and the like). Then, the position of the virtual object 30-1 in the field of view 70-1 is determined on the basis of the position of the virtual camera, and the virtual object 30-1 appears on a display on the basis of the thus determined position of the virtual object 30-1.

Since the position of the virtual camera in this process is continuously updated, so that a shift of position of the virtual object occurs between the points in time when the position of the virtual object was determined and when the virtual display appears on the display. That is, as seen in a field of view 70-2, a position of a virtual object 30-2 that actually appears on the display causes a shift from a position 32-2 of the virtual object which is expected from a position of the virtual camera at present (time t2). Such event is referred to as delay in display.

Moreover, besides the delay in display, there resides a concept regarding to what degree the user U can recognize the delay in display of the virtual object. Such recognizability of the delay in display by the user U will occasionally be referred to as "feeling of delay in display", hereinafter. In an exemplary case there is no real object around the virtual object, the feeling of delay in display of the virtual object is supposed to be small, due to absence of the real object that emphasizes the delay in display of the virtual object around such virtual object.

Figure 2:
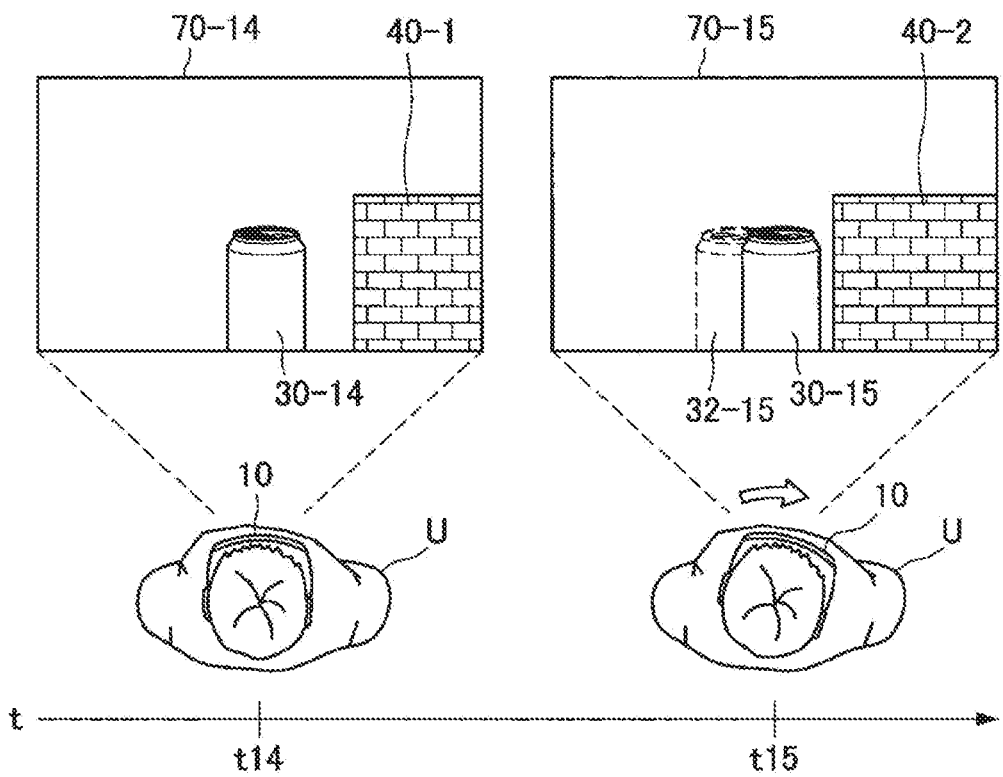
FIG. 2 is a drawing illustrating an overview of an embodiment of the present disclosure.

FIG. 2 is a drawing illustrating an overview of the embodiment of the present disclosure. As seen in FIG. 2, a virtual object 30-14 at time t14 is arranged in a field of view 70-14 of the user U. The user U swings the neck rightward over a duration from time t14 to time t15. Hence, the field of view 70-14 is shifted to a field of view 70-15. Now, as seen in the field of view 70-15, a position of a virtual object 30-15 that actually appears on the display causes a shift from a position 32-15 of a virtual object which is expected from a position of the virtual camera at present (time t15). Since a real object 40-2 resides close to the virtual object 30-15, the feeling of delay in display is supposed to be large.

Meanwhile, in a case there is a real object whose luminance is not similar to that of the virtual object close to such virtual object, the feeling of delay in display is supposed to be large, since the real object emphasizes the delay in display of the virtual object. The delay in display of the virtual object is again supposed to be smaller in a case where the virtual object is in motion, as compared with a case where the virtual object is motionless, since the delay in display of the virtual object is less likely to be emphasized.

Figure 3:
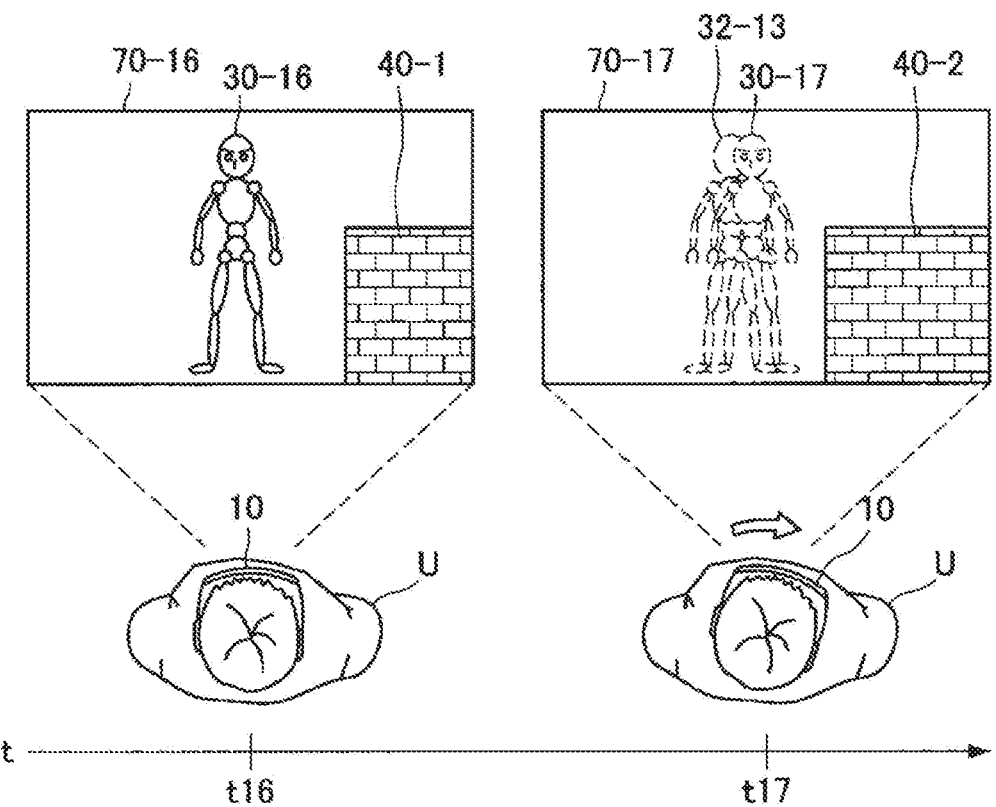
FIG. 3 is a drawing illustrating an overview of an embodiment of the present disclosure.

FIG. 3 is a drawing illustrating an overview of an embodiment of the present disclosure. As seen in FIG. 3, a virtual object 30-16 at time t16 is arranged in a field of view 70-16 of the user U. The user U swings the neck rightward over a duration from time t16 to time t17. Hence, the field of view 70-16 is shifted to a field of view 70-17. Now, as seen in the field of view 70-17, a position of a virtual object 30-17 that actually appears on the display causes a shift from a position 32-13 of a virtual object which is expected from a position of the virtual camera at present (time t17). Although the real object 40-2 resides close to the virtual object 30-15, the feeling of delay in display is supposed to be small, since the definition of the virtual object 30-17 has been reduced.

It is anticipated that the stronger the feeling of delay in display of the virtual object would be, the stronger the feeling of wrongness regarding the delay in display of the virtual object would be. Meanwhile, it is also anticipated that the more largely the display of the virtual object is modified, the more the recognizability of the virtual object would degrade. Hence, the present specification will principally propose a technology capable of reducing the feeling of wrongness in display of the virtual object, while suppressing recognizability of the virtual object from degrading.

When the real object resides in the field of view of the user U, an information processing device 10 detects distance between the user U and the real object, as an exemplary information of the real object. The embodiment of the present disclosure is principally presumed that the information processing device 10 has a stereo camera, so as to create a depth map on the basis of a left image and a right image captured by the stereo camera, and to detect the distance between the user U and the real object referring to the depth map. The distance between the user U and the real object may, however, be detected by any method. For example, the distance between the user U and the real object may be detected using a ranging sensor if equipped to the information processing device 10. The ranging sensor may typically be a time of flight (TOF) sensor and the like.

Types of the real object (for example, shape, size, color, luminance, motion, and the like of the real object) are not specifically limited. Also the virtual object 30, although exemplified in FIG. 1 as a cylindrical object, may have any type (for example, shape, size, color, luminance, motion, and the like of the virtual object 30) without special limitation.

Referring now to FIG. 1, exemplified is the information processing device 10 with a structure of goggle-type head mounted display (HMD) worn on the head of the user U. Shape of the HMD is, however, not limited to the goggle-type, instead allowing an eyeglass type or the like. The information processing device 10 is even not limited to the HMD. For example, the information processing device 10 may be a smartphone, tablet terminal, mobile phone, or other mobile device.

The embodiment of the present disclosure also principally presumes that the information processing device 10 has a transmissive display. The user U in this case can visually recognize not only the virtual object 30 that appears on the display, but also the real object behind the display. The information processing device 10 may, however, has a non-transmissive display. The user U in this case can visually recognize the real object, with the aid of the virtual object 30 that appears on the display, and an image that is captured by a camera owned by the information processing device 10 and appears on the display.

The embodiments of the present disclosure have been outline above.

1. DETAILS OF EMBODIMENTS

Next, the embodiments of the present disclosure will be detailed.

[1.1. Exemplary Functional Configuration of Information Processing Device]

Figure 4:
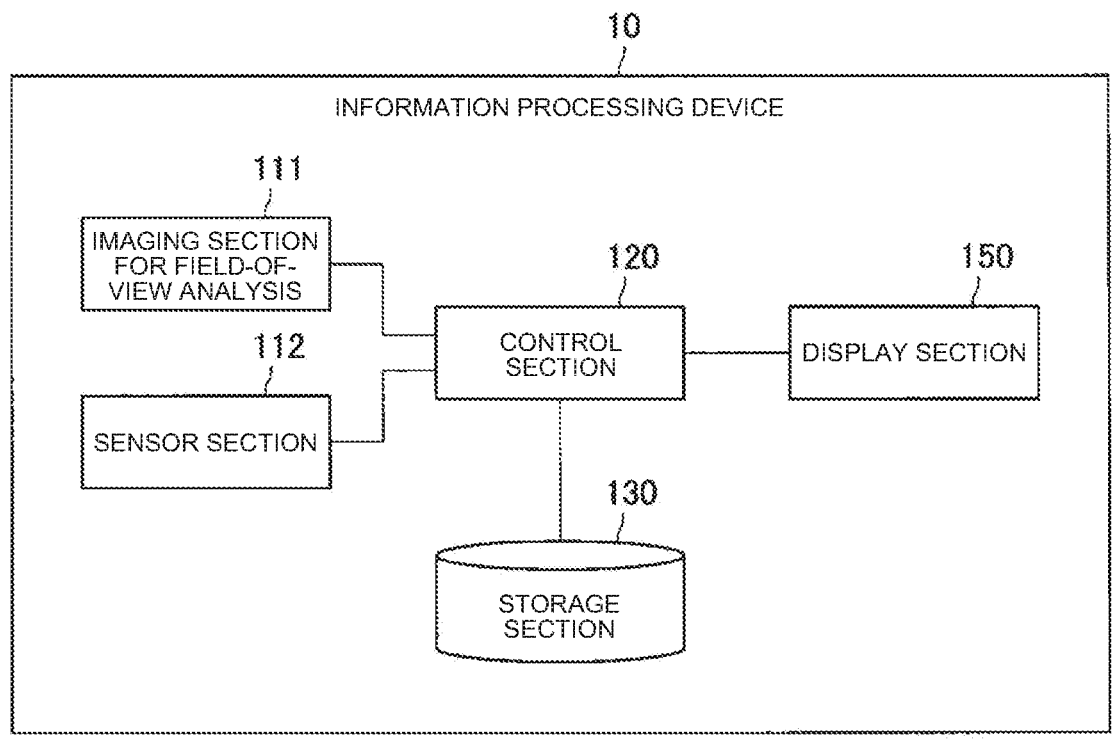
FIG. 4 is a diagram illustrating an exemplary functional configuration of an information processing device according to an embodiment of the present disclosure.

Next, an exemplary functional configuration of the information processing device 10 according to an embodiment of the present disclosure will be explained. FIG. 4 is a diagram illustrating an exemplary functional configuration of the information processing device 10 according to an embodiment of the present disclosure. As illustrated in FIG. 4, the information processing device 10 has an imaging section for field-of-view analysis 111, a sensor section 112, a control section 120, a storage section 130, and a display section 150.

Figure 5:
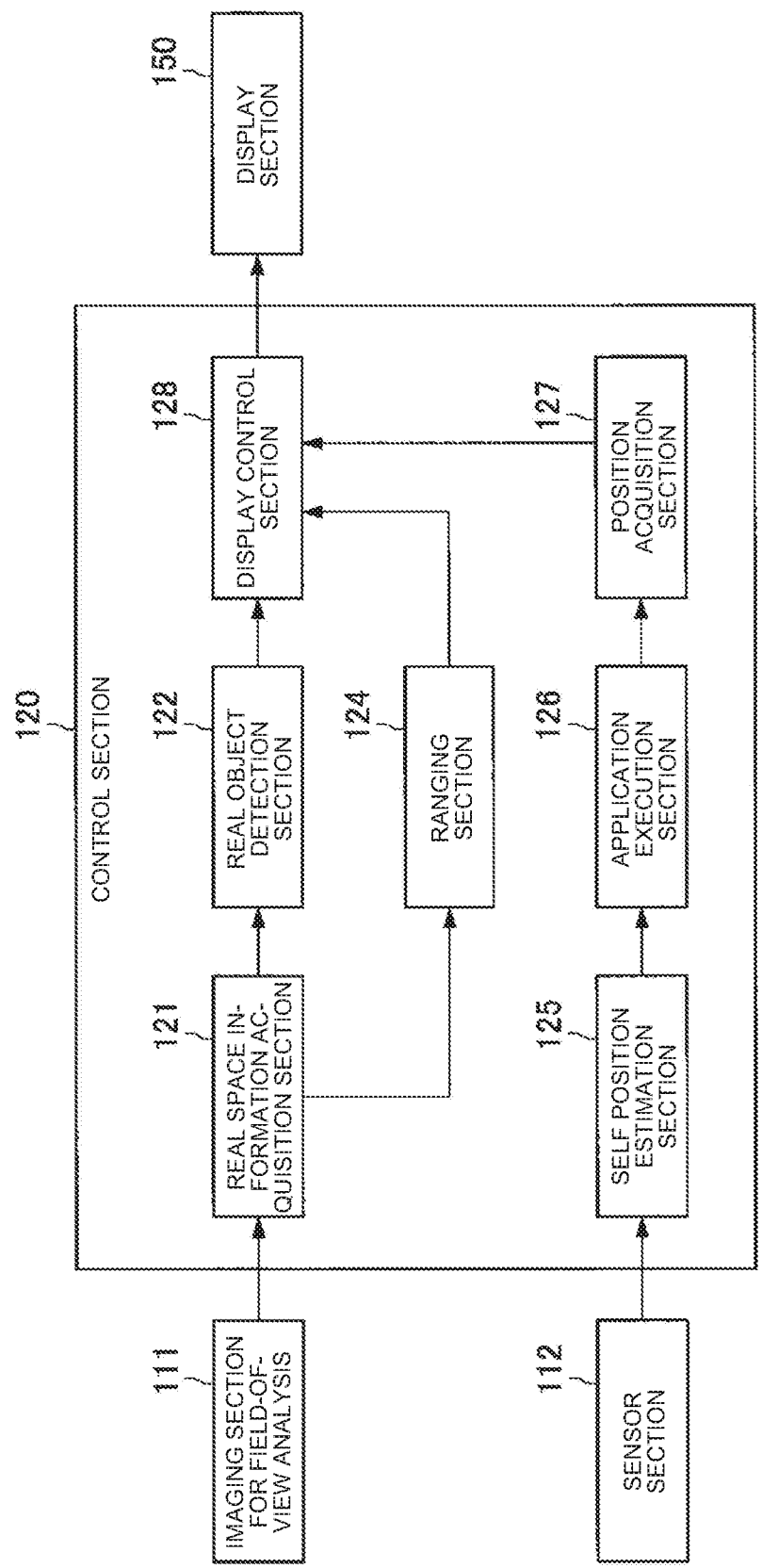
FIG. 5 is a diagram illustrating an exemplary detailed configuration of a control section.

The imaging section for field-of-view analysis 111 functions to acquire an image (image for field-of-view analysis), by taking a picture of a field-of view of the user U. For example, the imaging section for field-of-view analysis 111 has a stereo camera, and acquires a left image and a right image captured by the stereo camera. The left image and the right image captured by the stereo camera are used for detection of distance by a ranging section 124 (FIG. 5). Note, as described above, that a variety of ranging sensors may alternatively be employed, in place of the stereo camera and the ranging section 124. The imaging section for field-of-view analysis 111 may be integrated with the information processing device 10, or may be a separate body independent of the information processing device 10.

The sensor section 112 is configured to have a sensor, and functions to detect motion of a field of view of the user U. For example, the sensor section 112 may be configured to have an acceleration sensor, and may function to detect motion of a field of view of the user U on the basis of acceleration detected by the acceleration sensor. Alternatively, the sensor section 112 may be configured to have a gyro sensor, and may function to detect motion of a field of view of the user U on the basis of angular velocity detected by the gyro sensor. Note that the sensor section 112 is omissible, if motion of the field of view of the user U is detectable on the basis of the image for field-of-view analysis captured by the imaging section for field-of-view analysis 111.

The storage section 130 is configured to have a memory, which is a storage medium that stores a program to be executed on the control section 120, or data necessary for executing the program. The storage section 130 temporarily stores data for later calculation by the control section 120. The storage section 130 is composed of a magnetic memory device, semiconductor memory device, optical memory device, optomagnetic memory device, or the like.

The display section 150 functions to display a variety of screens. The display section 150 may be of any type. For example, the display section 150 may sufficiently be a display (display device) capable of presenting screens visually recognizable by the user. The display section 150 may more specifically be a liquid crystal display, or an organic electro-luminescence (EL) display.

The control section 120 controls various sections of the information processing device 10. FIG. 5 is a diagram illustrating an exemplary detailed configuration of the control section 120. As illustrated in FIG. 5, the control section 120 has a real space information acquisition section 121, a real object detection section 122, a ranging section 124, a self position estimation section 125, an application execution section 126, a position acquisition section 127, and a display control section 128. These functional blocks will be detailed later. The control section 120 may be composed of one, or two or more central processing units (CPUs), and the like. The control section 120, when composed of processing unit such as CPU, may be constructed using an electronic circuit.

An exemplary functional configuration of the information processing device 10 according to the present embodiment has been explained.

[1.2. Detailed Functions of Information Processing Device]

Next, the functions of the information processing device 10 according to the present embodiment will be detailed. In the information processing device 10 according to the embodiment of the present disclosure, the real space information acquisition section 121 acquires information of the real object (also referred to as "object", hereinafter) arranged in the real space. More specifically, the real space information acquisition section 121 acquires information of the real object, by acquiring a left image and a right image of the real object from the imaging section for field-of-view analysis 111.

The ranging section 124 creates a depth map on the basis of the left image and the right image captured by the imaging section for field-of-view analysis 111, and outputs the created depth map to the display control section 128.

The real object detection section 122 determines whether a predetermined real object (flat plane or the like, for example) resides in the field of view or not, on the basis of the left image and the right image captured by the imaging section for field-of-view analysis 111. In a case where the predetermined real object resides in the field of view, the real object detection section 122 detects a feature (for example, position of the flat plane in the real space, and the like) of the predetermined real object, and outputs it to the application execution section 126 and the display control section 128. The real object detection section 122 may alternatively detect a feature of the predetermined real object, on the basis of the depth map created by the ranging section 124.

The self position estimation section 125 estimates a position and attitude (position of a virtual camera) of the imaging section for field-of-view analysis 111 in the real space as a self position, on the basis of the recognition result of the real space. The self position estimation section 125 recognizes the real space, on the basis of a plurality of images captured continuously over time by the imaging section for field-of-view analysis 111. Now for improved accuracy of recognition, the self position estimation section 125 may additionally use sensing data (for example, acceleration detected by an acceleration sensor, angular velocity detected by a gyro sensor, or the like) obtained by the sensor section 112, to recognize the real space.

The application execution section 126 determines the virtual object to be arranged in the virtual space, and determines a position of the virtual object in the virtual space. Now, the application execution section 126 may alternatively determine the position of the virtual object, on the basis of a feature of the real object detected by the real object detection section 122. For example, in a case where the position of the flat plane was detected by the real object detection section 122, the application execution section 126 may determine the position of the flat plane detected by the real object detection section 122, as a position where the virtual object is to be arranged.

The application execution section 126 determines the position of the virtual object in the field of view, and the distance between the imaging section for field-of-view analysis 111 and the virtual object, on the basis of the position of the virtual object in the virtual space, and the position and attitude (position of the virtual camera) of the imaging section for field-of-view analysis 111 in the real space. The application may be of any type. For example, the application may be a game application.

The position acquisition section 127 acquires the position of the virtual object obtained by the application execution section 123. The position acquisition section 127 acquires the position in the virtual space of the virtual object, obtained by the application execution section 123. The position acquisition section 127 also acquires the position in the field of view of the virtual object, obtained by the application execution section 123.

The display control section 128 acquires the feature of the real object detected by the real object detection section 122. The display control section 128 also acquires the depth map created by the ranging section 124. The display control section 128 also acquires the position of the virtual object acquired by the position acquisition section 127.

Now the display control section 128 controls display of at least a boundary of the virtual object, on the basis of the position of the virtual object acquired by the position acquisition section 127, and the feature of the real object that resides in the real space and is located away from the virtual object, detected by the real object detection section 122. With such structure, it now becomes possible to reduce feeling of wrongness in display of the virtual object, while suppressing recognizability of the virtual object from degrading. For example, in a case where the virtual object and the real object are in a first positional relation, the display control section 128 displays at least the boundary of the virtual object differently from a case where the virtual object and the real object are in a second positional relation which is different from the first positional relation. In a case where the positional relation between the virtual object and the real object changes from the first positional relation to the second positional relation, in response to a motion of the field of view of the user to whom the virtual object is presented, now the display control section 128 may modify the display of at least the boundary of the virtual object.

More specifically, the display control section 128 calculates a predicted strength of the feeling of delay in display of the virtual object, on the basis of the feature of the real object. The display control section 128 then controls the display of at least the boundary of the virtual object, on the basis of the position and the predicted strength of the feeling of delay in display of the virtual object. More specifically, the display control section 128 may control at least one of position, shape, motion, color, luminance and definition of boundary of the virtual object.

The feature of the real object may be of any type. For example, the feature of the real object may contain at least either shape or motion of the real object. For example, the larger the percentage of straight line part in the edge of the real object would be, the larger the feeling of delay in display of the virtual object would be. The display control section 128 then preferably increases the predicted strength of the feeling of delay in display, as the percentage of straight line part in the edge of the real object increases.

Meanwhile, the larger the motion of the real object would be, the smaller the feeling of delay in display of the virtual object would be. The display control section 128 then preferably increases the predicted strength of the feeling of delay in display, as the motion of the real object increases.

The display control section 128 may calculate the predicted strength of the feeling of delay in display on the basis of the feature of the real object, may calculate the predicted strength of the feeling of delay in display on the basis of the feature of the virtual object, or may calculate the predicted strength of the feeling of delay in display on the basis of both of the feature of the real object and the feature of the virtual object.

The feature of the virtual object may be of any type. For example, the feature of the virtual object may contain at least either shape or motion of the virtual object. For example, the larger the percentage of straight line part in the edge of the virtual object would be, the larger the feeling of delay in display of the virtual object would be. The display control section 128 then preferably increases the predicted strength of the feeling of delay in display, as the percentage of straight line part in the edge of the virtual object increases.

Meanwhile, the larger the motion of the virtual object would be, the smaller the feeling of delay in display of the virtual object would be. The display control section 128 then preferably increases the predicted strength of the feeling of delay in display, as the motion of the virtual object increases.

Now the predicted strength of the feeling of delay in display may be determined for each virtual object. Alternatively, the predicted strength of the feeling of delay in display may be determined preliminarily for each feature of the virtual object. The paragraphs below will specifically explain a case where the predicted strength of the feeling of delay in display of the virtual object is preliminarily determined, for each virtual object and for each feature of the virtual object. FIGS. 6 to 8 are charts summarizing exemplary virtual objects, and predicted strengths of feeling of delay in display correlated to the virtual objects.

Referring now to FIG. 6, the predicted strength of the feeling of delay in display, corresponded to a virtual object 30-31 with a large percentage of straight line part in the edge, is given as "1.0"; the predicted strength of the feeling of delay in display, corresponded to a virtual object 30-32 with a medium percentage of straight line part in the edge, is given as "0.9"; and the predicted strength of the feeling of delay in display, corresponded to a virtual object 30-33 with a small percentage of straight line part in the edge, is given as "0.7".

Referring now to FIG. 7, the predicted strength of the feeling of delay in display, corresponded to a motionless virtual object 30-34, is given as "0.4"; the predicted strength of the feeling of delay in display, corresponded to a virtual object 30-35 that moves the eyes so as to gaze the user, is given as "0.35"; and the predicted strength of the feeling of delay in display, corresponded to a vigorous virtual object 30-36, is given as "0.25". The virtual object 30-35 that moves the eyes so as to gaze the user will be described later, referring to FIG. 12.

Referring now to FIG. 8, the predicted strength of the feeling of delay in display, corresponded to a virtual object 30-37 with small vertical wagging motion of the tail, is given as "0.15"; and the predicted strength of the feeling of delay in display, corresponded to a virtual object 30-38 with a large lateral swinging motion of the head, is given as "0.1".

The predicted strength of the feeling of delay in display may be determined as described above. In a case where the predicted strength of the feeling of delay in display exceeds a threshold value, the display control section 128 then preferably modifies the display of at least the boundary of the virtual object. More specifically, in a case where the predicted strength of the feeling of delay in display exceeds a threshold value, the display control section 128 then preferably modifies at least one of position, shape, motion, color, luminance and definition of boundary of the virtual object.

Note that the predicted strength of the feeling of delay in display of the virtual object may preliminarily be determined in an application, for each virtual object and for each feature of the virtual object. Also the modified virtual object, when the predicted strength of the feeling of delay in display exceeds a threshold value, may preliminarily be determined in an application as an avoidance pattern. The modified virtual object may be determined uniquely, or the virtual object may be modified so that the predicted strength of the feeling of delay in display will more largely decrease, as the predicted strength of the feeling of delay in display increases. The paragraphs below will explain an exemplary modification of display of the virtual object.

FIG. 9 is a drawing illustrating an exemplary modification of color of the virtual object. As seen in FIG. 9, a virtual object 30-3 at time t3 is arranged in a field of view 70-3 of the user U. Since the user U swings the neck rightward over a duration from time t3 to time t4, so that the field of view 70-3 of the user U at time t4 has been shifted to a field of view 70-4.

In a case where the predicted strength of the feeling of delay in display exceeds a threshold value, the display control section 128 then preferably lightens the virtual object 30-3. This is supposed to eventually reduce the feeling of delay in display of the virtual object 30-4. For example, in a case where the predicted strength of the feeling of delay in display exceeds a threshold value, the display control section 128 preferably modifies the color of the virtual object 30-3, closer to the color of a real object 40-1 whose distance from the virtual object 30-3 is smaller than a predetermined distance (resulting in the virtual object 30-4). This is supposed to eventually reduce the feeling of delay in display of the virtual object 30-4.

In the example illustrated in FIG. 9, the predicted strength of the feeling of delay in display may be calculated by any method. For example, in a case where the feature of the real object 40-1 contains a color of the real object 40-1, and the feature of the virtual object 30-3 contains a color of the virtual object 30-3, the display control section 128 may calculate the predicted strength of the feeling of delay in display more largely, as the color of the real object 40-1 and the color of the virtual object 30-3 become less similar.

Figure 10:
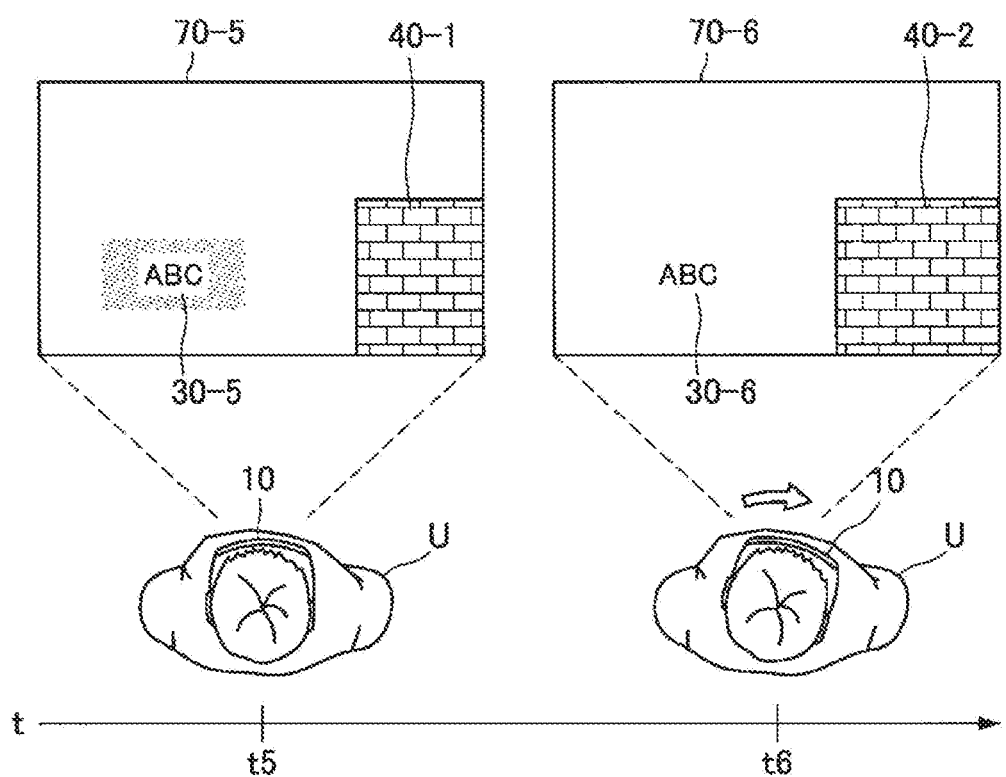
FIG. 10 is a drawing illustrating an exemplary modification of luminance of the virtual object.

FIG. 10 is a drawing illustrating an exemplary modification of luminance of the virtual object. As seen in FIG. 10, a virtual object 30-5 at time t5 is arranged in a field of view 70-5 of the user U. Since the user U swings the neck rightward over a duration from time t5 to time t6, so that the field of view 70-5 of the user U at time t6 has been shifted to a field of view 70-6.

In a case where the predicted strength of the feeling of delay in display exceeds a threshold value, the display control section 128 then preferably decreases the luminance of the virtual object 30-5. This is supposed to eventually reduce the feeling of delay in display of the virtual object 30-6. For example, in a case where the predicted strength of the feeling of delay in display exceeds a threshold value, the display control section 128 preferably modifies the luminance of the virtual object 30-5, closer to the luminance of the real object 40-1 whose distance from the virtual object 30-5 is smaller than a predetermined distance (resulting in the virtual object 30-6).

In the example illustrated in FIG. 10, the predicted strength of the feeling of delay in display may be calculated by any method. For example, in a case where the feature of the real object 40-1 contains the luminance of the real object 40-1, and the feature of the virtual object 30-5 contains the luminance of the virtual object 30-5, the display control section 128 may calculate the predicted strength of the feeling of delay in display more largely, as a difference between the luminance of the real object 40-1 and the luminance of the virtual object 30-5 becomes larger.

Figure 11:
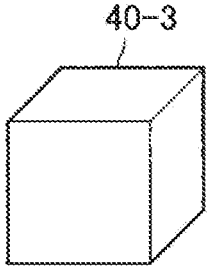
FIG. 11 is a chart summarizing exemplary relations among luminance of a real object, luminance of virtual objects, and predicted strengths of feeling of delay in display.

FIG. 11 is a chart summarizing exemplary relations among luminance of a real object, luminance of virtual objects, and predicted strengths of the feeling of delay in display. As seen in FIG. 11, summarized are predicted strengths of the feeling of delay in display, respectively corresponding to luminance of a real object 40-3 and luminance of virtual objects 30-39 to 30-42. As seen in FIG. 11, the predicted strength of the feeling of delay in display of the virtual object may be set larger, as a difference between the luminance of the real object and the luminance of the virtual object becomes larger.

In a case where the predicted strength of the feeling of delay in display exceeds a threshold value, the display control section 128 may give a motion to the virtual object, or, enhance the motion of the virtual object. For example, in the case where the predicted strength of the feeling of delay in display exceeds a threshold value, the display control section 128 may modify the motion of the virtual object from a motionless state to a state moving the eyes so as to gaze the user. This is supposed to eventually reduce the feeling of delay in display of the virtual object.

Figure 12:
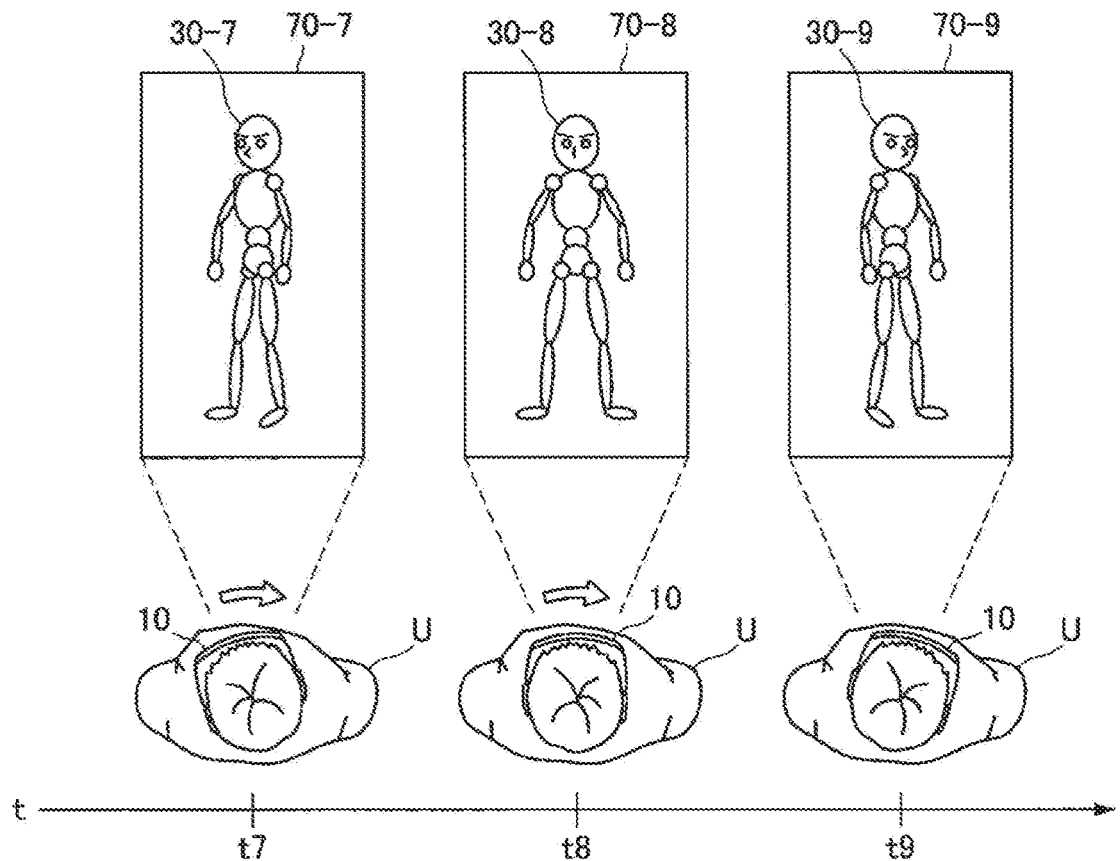
FIG. 12 is a drawing illustrating an exemplary virtual object that moves the eyes so as to gaze the user.

FIG. 12 is a drawing illustrating an exemplary virtual object that moves the eyes so as to gaze the user. As seen in FIG. 12, since the user U swings the neck rightward over a duration from time t7 to time t9, so that a field of view 70-7 has been shifted to a field of view 70-9. A virtual object 30-7 in this state may move the eyes so as to gaze the user (virtual objects 30-8, 30-9).

Figure 13:
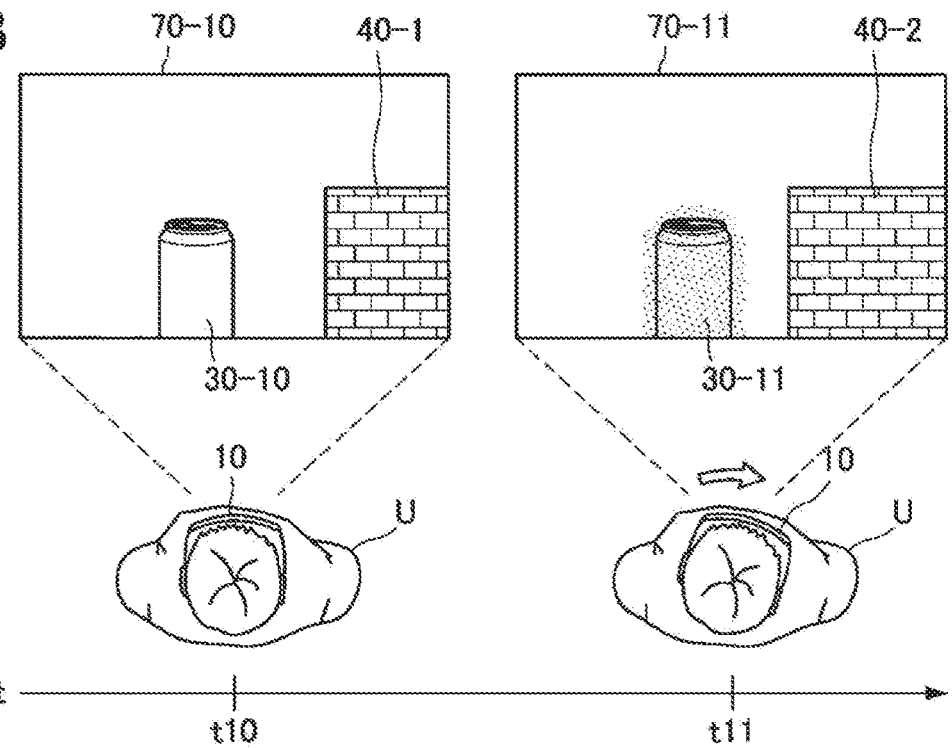
FIG. 13 is a drawing illustrating an exemplary modification of luminance of the virtual object.

FIG. 13 is a drawing illustrating an exemplary modification of luminance of the virtual object. As seen in FIG. 13, a virtual object 30-10 at time t10 is arranged in a field of view 70-10 of the user U. Since the user U swings the neck rightward over a duration from time t10 to time t11, so that the field of view 70-10 of the user U at time t11 has been shifted to a field of view 70-11.

In a case where the predicted strength of the feeling of delay in display exceeds a threshold value, the display control section 128 then preferably reduces recognizability (for example, definition) of the boundary of the virtual object 30-10 (preferably blurs the virtual object 30-10) (resulting in a virtual object 30-11). This is supposed to eventually reduce the feeling of delay in display of the virtual object 30-10.

Alternatively, in a case where the predicted strength of the feeling of delay in display exceeds a threshold value, the display control section 128 then preferably brings the position of the virtual object away from the real object. This is supposed to eventually reduce the feeling of delay in display of the virtual object. For example, in a case where the predicted strength of the feeling of delay in display exceeds a threshold value, the display control section 128 preferably brings the position of the virtual object away from the real object whose distance from the virtual object is smaller than a predetermined distance.

Alternatively, in a case where the predicted strength of the feeling of delay in display exceeds a threshold value, the display control section 128 then preferably modifies the shape of the virtual object. This is supposed to eventually reduce the feeling of delay in display of the virtual object. For example, in a case where the predicted strength of the feeling of delay in display exceeds a threshold value, the display control section 128 then preferably modifies the shape of the virtual object so as to reduce the percentage of straight line part in the edge.

The predicted strength of the feeling of delay in display may be calculated taking a position of a straight line composing the real object into consideration. That is, in a case where the feature of the real object contains a position of a straight line that composes the real object, and the feature of the virtual object contains a position of the virtual object, the display control section 128 may calculate the predicted strength of the feeling of delay in display more largely, as the position of the virtual object and the position of the straight line that composes the real object become closer. Such example will be detailed referring to FIG. 14.

Figure 14:
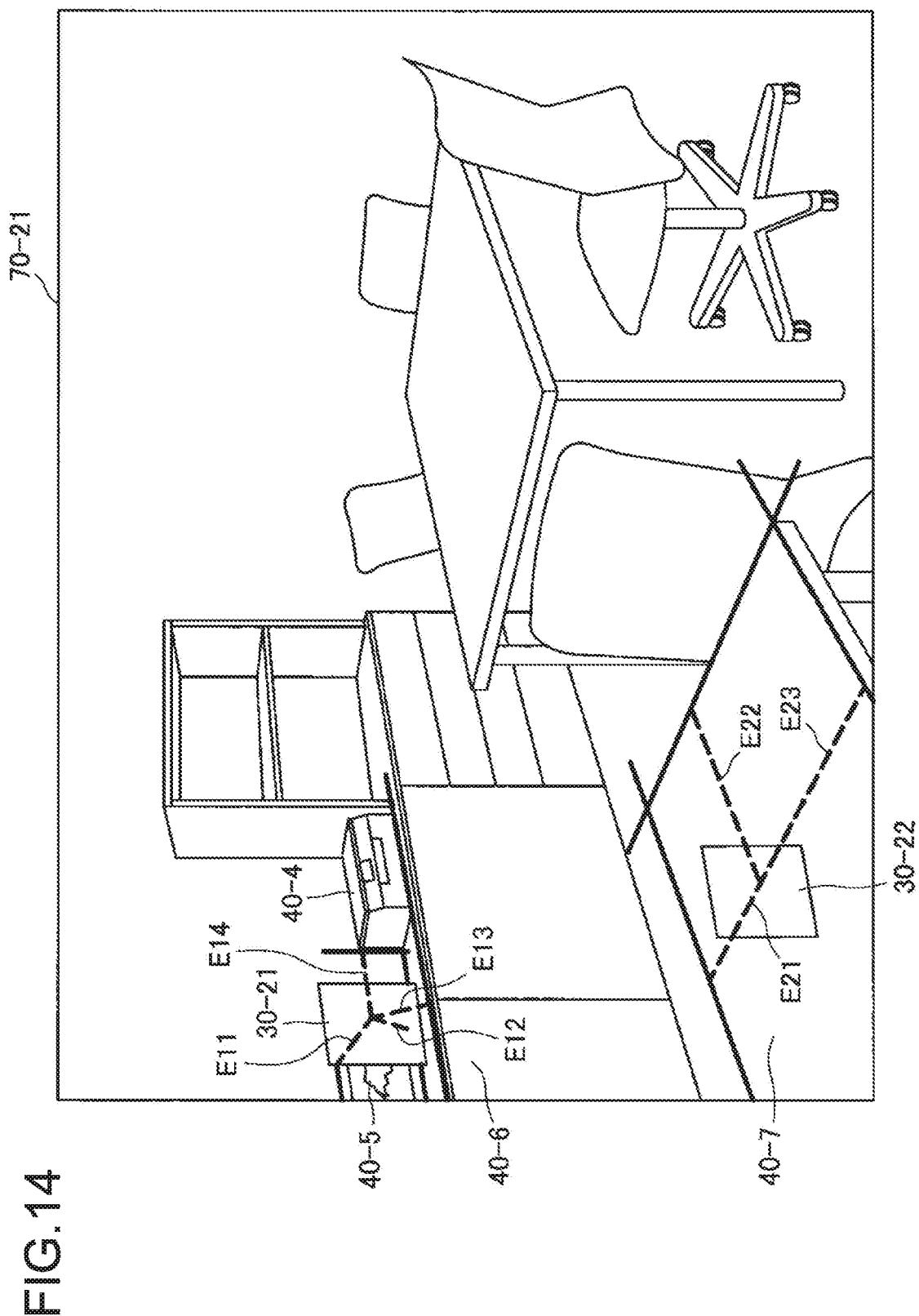
FIG. 14 is a drawing illustrating an exemplary calculation of predicted strength of feeling of delay in display, on the basis of positions of lines composing a real object.

FIG. 14 is a drawing illustrating an exemplary calculation of the predicted strength of the feeling of delay in display, on the basis of positions of straight lines composing the real object. As seen in FIG. 14, a field of view 70-21 of the user U is presented. In the field of view 70-21 of the user U, a virtual object 30-21 and a virtual object 30-22 are arranged.

Within a predetermined range from the virtual object 30-21, one straight line composing a real object 40-4, two straight lines composing a real object 40-5, and one straight line composing a real object 40-6 are arranged. Also perpendiculars E11 to E14 are drawn from the virtual object 30-21 to the respective straight lines.

Now assume a case where the display control section 128 calculates the predicted strength of the feeling of delay in display more largely, as the positions of the virtual objects and the positions of the straight lines that compose the real objects become closer. In such case, the display control section 128 may calculate the predicted strengths of the feeling of delay in display as "0.2", "0.18", "0.15" and "0.05", respectively to the perpendiculars E11 to E14.

Given a standard predicted strength of the feeling of delay in display of the virtual object 30-21 as "1.0", the display control section 128 may sum up the predicted strengths of the feeling of delay in display of "0.2", "0.18", "0.15" and "0.05" which are respectively corresponded to the perpendiculars E11 to E14, to "1.0" which is the predicted strength of the feeling of delay in display of the virtual object 30-21, to thereby estimate the predicted strength of the feeling of delay in display of the virtual object 30-21 as "1.58".

There are also three straight lines that compose a real object 40-7, within a predetermined range from the virtual object 30-22. From the virtual object 30-22, drawn are perpendiculars E21 to E23 to the respective straight lines. The display control section 128 may similarly calculate the predicted strengths of the feeling of delay in display as "0.03", "0.018" and "0.01", respectively to the perpendiculars E21 to E23.

Given a standard predicted strength of the feeling of delay in display of the virtual object 30-21 as "1.0", the display control section 128 may sum up predicted strengths of the feeling of delay in display of "0.03", "0.018" and "0.01" which are respectively corresponded to the perpendiculars E21 to E23, to "1.0" which is the standard predicted strength of the feeling of delay in display of the virtual object 30-21, to thereby estimate the predicted strength of the feeling of delay in display of the virtual object 30-22 as "1.058".

An explanation has been made on an exemplary calculation of the predicted strength of the feeling of delay in display, on the basis of the positions of the straight lines composing the real object, referring to FIG. 14. Note that the predicted strength of the feeling of delay in display may be calculated on the basis of direction of the straight lines composing the real object, rather than the position of the straight lines composing the real object. In this case, the predicted strength of the feeling of delay in display may be calculated more largely, as the straight lines composing the real object and the straight lines composing the virtual object are aligned more closely in parallel.

More specifically, in a case where the feature of the real object contains a direction of a straight line that composes the real object, and the feature of the virtual object contains a direction of the a straight line that composes the virtual object, the display control section 128 may calculate the predicted strength of the feeling of delay in display more largely, as an angle between the direction of the straight line that composes the virtual object and the direction of the straight line that composes the real object becomes smaller. Similarly to the case illustrated in FIG. 14, it is acceptable in this case to add only the predicted strength of the feeling of delay in display, for the case where the distance between the virtual object and the straight line composing the real object is smaller than a predetermined distance, to the standard predicted strength of the feeling of delay in display of the virtual object.

Note that the angle between the direction of the straight line that composes the virtual object and the direction of the straight line that composes the real object may be calculated using an inner product of a direction vector of the straight line composing the virtual object and a direction vector of the straight line composing the real object.

The paragraphs above have explained an exemplary control of display of the virtual object by the display control section 128, on the basis of at least either the feature of the real object or the virtual object. The feeling of delay in display may, however, change according to motion of the virtual camera. The display control section 128 then may control display of at least a boundary of the virtual object according to the motion of the virtual camera, in place of using at least either the feature of the real object or the virtual object, or in addition to use of at least either the feature of the real object or the virtual object.

In a case where the motion of the virtual camera exceeds a predetermined motion, the display control section 128 may modify display of at least the boundary of the virtual object. For example, in a case where the motion of the virtual camera exceeds a predetermined motion, the display control section 128 may increase the predicted strength of the feeling of delay in display of the virtual object. For example, the display control section 128 may calculate the predicted strength of the feeling of delay in display of the virtual object more largely, as the motion of the virtual camera becomes larger. Display of the virtual object based on the predicted strength of the feeling of delay in display may be controlled in the same way as described above.

Functions of the information processing device 10 according to the present embodiment have been explained.

[1.3. Exemplary Operations of Information Processing Device]

Figure 15:
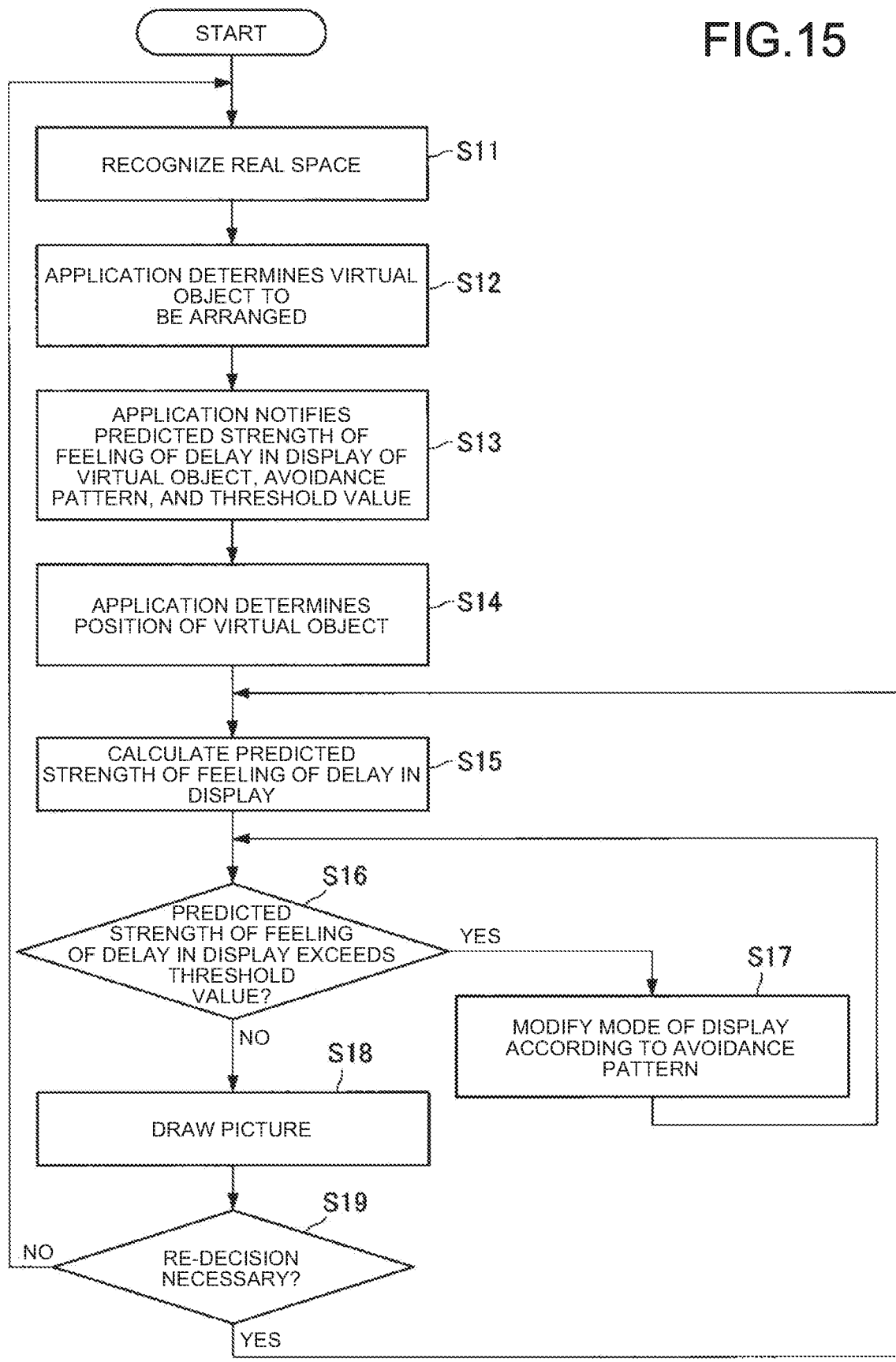
FIG. 15 is a flow chart illustrating exemplary operations of an information processing device of the present embodiment.

Next, exemplary operations of the information processing device 10 according to the present embodiment will be explained. FIG. 15 is a flow chart illustrating exemplary operations of the information processing device 10 according to the present embodiment. Note that the exemplary operations illustrated in FIG. 15 merely represent one typical flow of operations of the information processing device 10 according to the present embodiment. The operations of the information processing device 10 according to the present embodiment are therefore not limited to the exemplary operations illustrated in FIG. 15.

As seen in FIG. 15, the self position estimation section 125 recognizes the real space, on the basis of a plurality of images captured continuously over time by the imaging section for field-of-view analysis 111 (S11). The self position estimation section 125 estimates a position and attitude (position of a virtual camera) of the imaging section for field-of-view analysis 111 in the real space as a self position, on the basis of the recognition result of the real space.

The application execution section 126 determines the virtual object to be arranged in the virtual space (S12), and notifies the display control section 128 of a combination of the predicted strength of the feeling of delay in display of the virtual object, the avoidance pattern and the threshold value (S13). The application execution section 126 determines a position of the virtual object in the virtual space (S14). The display control section 128 calculates the predicted strength of the feeling of delay in display of the virtual object, on the basis of at least either the feature of the virtual object or the feature of the real object (S15).

In a case where the predicted strength of the feeling of delay in display exceeds a threshold value ("Yes" in S16), the display control section 128 modifies a mode of display of the virtual object referring to the avoidance pattern (S17), and advances the operation to S16. The mode of display of the virtual object may be modified sequentially in this way referring to the avoidance patterns respectively corresponded to the individual features of the virtual object, until the predicted strength of the feeling of delay in display will no more exceed the threshold value.

Meanwhile, for example, in a case where the predicted strength of the feeling of delay in display does not exceed the threshold value ("No" in S16), the display control section 128 may draw the virtual object (S18), and may advance the operation to S15 if re-decision is necessary ("Yes" in S19) typically due to modification of at least either the feature of the virtual object or the feature of the real object, meanwhile may advance the operation to S11 if re-decision is not necessary ("No" in S19).

The paragraphs above have explained exemplary operations of the information processing device 10 according to the present embodiment.

2. EXEMPLARY HARDWARE CONFIGURATION

Figure 16:
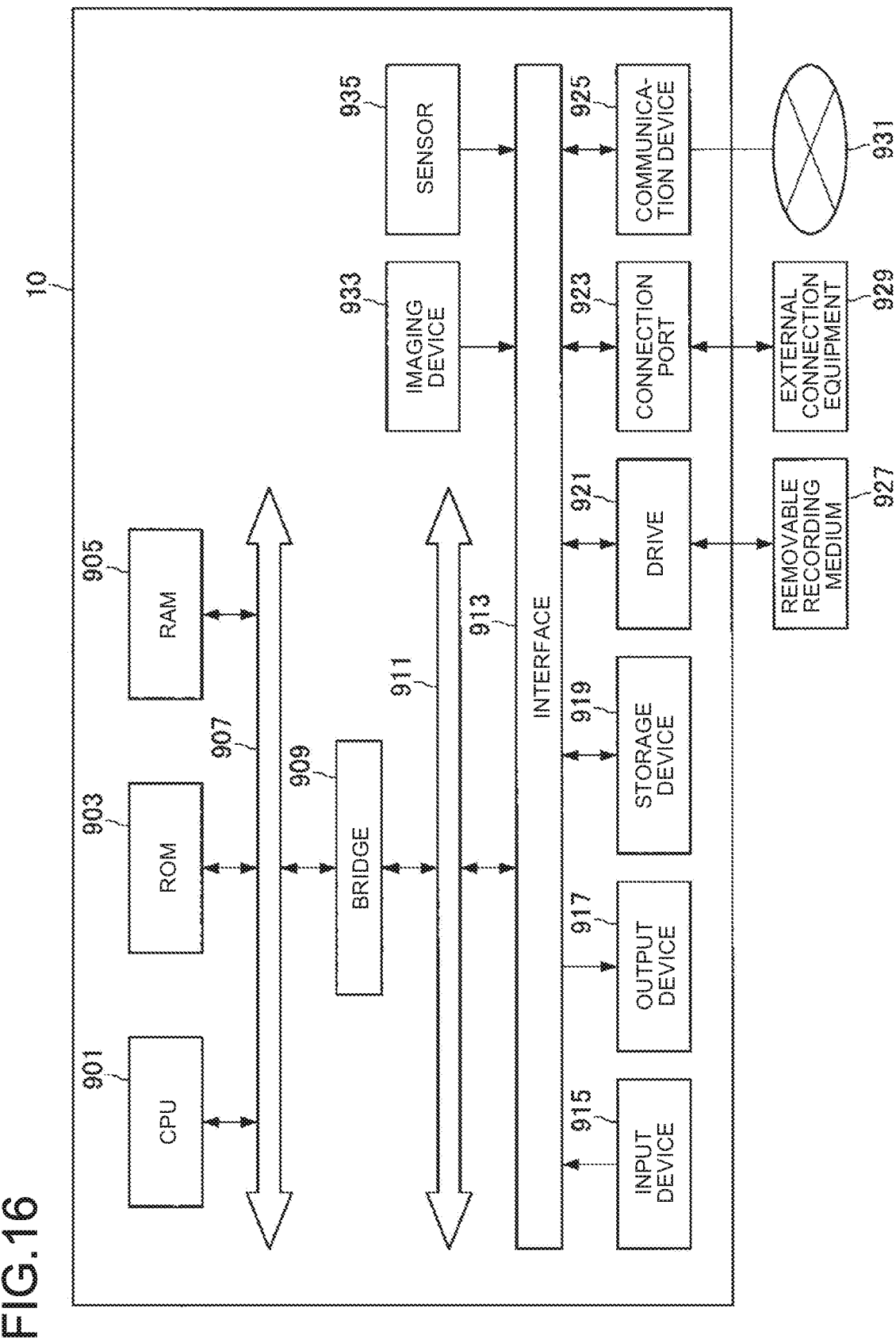
FIG. 16 is a block diagram illustrating an exemplary hardware configuration of the information processing device.

Next, an exemplary functional configuration of the information processing device 10 according to the present disclosure will be explained, referring to FIG. 16. FIG. 16 is a block diagram illustrating an exemplary hardware configuration of the information processing device 10 according to the embodiment of the present disclosure.

As seen in FIG. 16, the information processing device 10 has a central processing unit (CPU) 901, a read only memory (ROM) 903, and a random access memory (RAM) 905. The information processing device 10 may also have a host bus 907, a bridge 909, an external bus 911, an interface 913, an input device 915, an output device 917, a storage device 919, a drive 921, a connection port 923, and a communication device 925. In addition, the information processing device 10 may optionally has an imaging device 933 and a sensor 935. The information processing device 10 may alternatively have a processing circuit called digital signal processor (DSP) or application specific integrated circuit (ASIC), in place of, or in addition to the CPU 901.

The CPU 901 functions as an arithmetic processing unit and a control device, and controls the whole or a part of operations within the information processing device 10, according to a variety of programs recorded in the ROM 903, the RAM 905, the storage device 919, or the removable recording medium 927. The ROM 903 stores a program, calculation parameters, and the like used by the CPU 901. The RAM 905 temporarily stores a program executed by the CPU 901, parameters suitably varied during the execution, or the like. The CPU 901, the ROM 903, and the RAM 905 are mutually connected through the host bus 907 composed of an internal bus such as CPU bus. The host bus 907 is connected to an external bus 911 such as a peripheral component interconnect/interface (PCI) bus, through the bridge 909.

The input device 915 is a device operable by the user, such as mouse, keyboard, touch panel, button, switch and lever. The input device 915 may contain a microphone that senses voice of the user. The input device 915 may typically be a remote-controlled device making use of infrared radiation or other electric waves, or may be an external connection equipment 929 such as mobile phone, compatible to the operations on the information processing device 10. The input device 915 contains an input control circuit that generates an input signal in response to information entered by the user, and outputs it to the CPU 901. The user operates the input device 915 to enter various data into the information processing device 10, or to issue instruction for processing operations. Also the imaging device 933 described later can function as an input device, by capturing motion of user's hand, image of user's finger, or the like. In this case, a pointing position may be determined on the basis of the motion of the hand, or direction of the finger.

The output device 917 is composed of a device capable of notify the user of the obtained information in a visible or audible manner. The output device 917 may typically be any of display devices such as liquid crystal display (LCD), plasma display panel (PDP), and organic electro-luminescence (EL) display; display devices such as projector; holographic display device; sound output devices such as loudspeaker and headphone; and printer. The output device 917 outputs results, obtained after processing by the information processing device 10, in the form of picture that includes text, image, or the like, or in the form of sound that includes voice, audio data, or the like. The output device 917 may also have a light for illuminating the periphery, and the like.

The storage device 919 is a device that stores data, constructed as an exemplary storage section of the information processing device 10. The storage device 919 is typically composed of a magnetic storage device such as hard disk drive (HDD), semiconductor memory device, optical memory device, optomagnetic memory device, or the like. The storage device 919 stores a program to be executed by the CPU 901, various data, and various data acquired externally.

The drive 921 is a reader/writer for the removable recording medium 927, such as magnetic disk, optical disk, optomagnetic disk, and semiconductor memory, which is incorporated into, or externally attached to the information processing device 10. The drive 921 reads the information recorded in the attached removable recording medium 927, and outputs it to the RAM 905. The drive 921 also writes record into the attached removable recording medium 927.

The connection port 923 is used for directly connecting equipment to the information processing device 10. The connection port 923 may typically be a universal serial bus (USB) port, IEEE 1394 port, small computer system interface (SCSI) port, or the like. The connection port 923 may alternatively be an RS-232C port, optical audio terminal, high-definition multimedia interface (HDMI) (registered trademark) port, or the like. Connection of the external connection equipment 929 to the connection port 923 enables exchange of various data between the information processing device 10 and the external connection equipment 929.

The communication device 925 is, for example, a communication interface typically composed of a communication device through which connection to a communication network 931 is established, and the like. The communication device 925 can be a communication card, for example, for wired or wireless local area network (LAN), Bluetooth (registered trademark), wireless USB (WUSB), or the like. The communication device 925 may alternatively be an optical communication router, asymmetric digital subscriber line (ADSL) router, modems for various types of communication, or the like. The communication device 925 typically transmits/receives signal and so forth, to and from the Internet and other communication devices using a predetermined protocol such as TCP/IP. The communication network 931 to which the communication device 925 is connected is a network connected in a wired or wireless manner, and is typically the Internet, home LAN, infrared communication, radio wave communication, satellite communication, or the like.

The imaging device 933 is a device that takes a picture of the real space using an image sensor such as charge coupled device (CCD) or complementary metal oxide semiconductor (CMOS), and various components such as lens for controlling imaging of a subject image onto the image sensor, and generates a pictured image. The imaging device 933 may be a device for shooting still image, or a device for shooting video.

The sensor 935 is any of a variety of sensors typically including ranging sensor, acceleration sensor, gyro sensor, geomagnetic sensor, photosensor, sound sensor, and the like. The sensor 935 acquires information regarding the information processing device 10 per se, such as attitude of enclosure of the information processing device 10; and information regarding a periphery environment of the information processing device 10, such as brightness or noise around the information processing device 10. The sensor 935 may also have a global positioning system (GPS) sensor that receives a GPS signal to determine longitude and latitude of the device.

3. CONCLUSION

As has been described above, according to the embodiment of the present disclosure, provided is the information processing device 10 that includes the position acquisition section 127 that acquires a position of a virtual object, having been determined on the basis of a position of a virtual camera having been calculated on the basis of recognition result of a real space corresponding to an image captured by an imaging device; and the display control section 128 that controls display of at least a boundary of the virtual object, on the basis of the position of the virtual object, and a feature of a real object that resides in the real space.

With such structure, it now becomes possible to reduce feeling of wrongness in display of the virtual object, while suppressing recognizability of the virtual object from degrading.

Although having described the preferred embodiments of the present disclosure referring to the attached drawings, the technical scope of the present disclosure is not limited to these examples. It is apparent that those having ordinary knowledges in the technical field of the present disclosure could arrive at various altered examples or modified examples without departing from the technical spirit described in the claims, and also these examples are of course understood to belong to the technical scope of the present disclosure.

Also creatable is a program that enables built-in hardware in computer such as CPU, ROM and RAM to exhibit function similar to the function owned by the aforementioned control section 120. Also a computer-readable recording medium that records such program may be provided.

Locations of the individual constituents are not specifically limited so long as the aforementioned operations of the information processing device 10 are embodied. Part of the processes that takes place in the individual sections of the information processing device 10 may be undertaken by a server (not illustrated). In a specific example, a part or all of the individual blocks owned by the control section 120 of the information processing device 10 may reside in the server (not illustrated) and the like. For example, a part or all of the functions of the real object detection section 122, the ranging section 124, the self position estimation section 125 and the application execution section 126 in the information processing device 10 may reside in the server (not illustrated) and the like.

Effects described in this specification are merely illustrative or exemplary ones, and are not restrictive. That is, the technology according to the present disclosure can exhibit other effects apparent to those skilled in the art from the description of this specification, in combination with, or in place of the aforementioned effects.

Also the structures below belong to the technical scope of the present disclosure.

(1)
An information processing device comprising:
a position acquisition section that acquires a position of a virtual object in a real space, having been determined on the basis of a recognition result of the real space corresponding to an image captured by an imaging device; and
a display control section that controls display of at least a boundary of the virtual object, on the basis of the position of the virtual object, and a feature of a real object that resides in the real space and is away from the position of the virtual object.

(2)
The information processing device of (1),
wherein, in a case where the virtual object and the real object are in a first positional relation, the display control section displays at least the boundary of the virtual object differently from a case where the virtual object and the real object are in a second positional relation which is different from the first positional relation.

(3)
The information processing device of (2),
wherein, in a case where the positional relation between the virtual object and the real object changes from the first positional relation to the second positional relation, in response to a motion of a field of view of a user to whom the virtual object is presented, the display control section modifies the display of at least the boundary of the virtual object.

(4)
The information processing device of (1),
wherein the display control section calculates a predicted strength of a feeling of delay in display of the virtual object, on the basis of the feature of the real object, and controls the display of at least the boundary of the virtual object, on the basis of the position of the virtual object and the predicted strength of the feeling of delay in display.

(5)
The information processing device of (4),
wherein in a case where the predicted strength of the feeling of delay in display exceeds a threshold value, the display control section brings the position of the virtual object away from the real object.

(6)
The information processing device of (4),
wherein in a case where the predicted strength of the feeling of delay in display exceeds a threshold value, the display control section modifies a shape of the virtual object.

(7)
The information processing device of (4),
wherein in a case where the predicted strength of the feeling of delay in display exceeds a threshold value, the display control section gives a motion to the virtual object, or, enhances the motion of the virtual object.

(8)
The information processing device of (4),
wherein in a case where the predicted strength of the feeling of delay in display exceeds a threshold value, the display control section modifies at least either color or luminance of the virtual object closer to at least either color or luminance of the real object.

(9)
The information processing device of (4),
wherein in a case where the predicted strength of the feeling of delay in display exceeds a threshold value, the display control section reduces recognizability of the boundary of the virtual object.

(10)
The information processing device of (1),
wherein the feature of the real object contains at least either shape or motion of the real object.

(11)
The information processing device of (4),
wherein the display control section calculates the predicted strength of the feeling of delay in display, on the basis of the feature of the real object and the feature of the virtual object.

(12)
The information processing device of (11),
wherein the feature of the real object contains a position of a straight line that composes the real object,
the feature of the virtual object contains a position of the virtual object, and
the display control section calculates the predicted strength of the feeling of delay in display more largely, as the position of the virtual object and the position of the straight line that composes the real object become closer.

(13)
The information processing device of (11),
wherein the feature of the real object contains a direction of a straight line that composes the real object,
the feature of the virtual object contains a direction of the a straight line that composes the virtual object, and
the display control section calculates the predicted strength of the feeling of delay in display more largely, as an angle between the direction of the straight line that composes the virtual object and the direction of the straight line that composes the real object becomes smaller.

(14)
The information processing device of (11),
wherein the feature of the virtual object contains at least either shape or motion of the virtual object.

(15)
The information processing device of (11),
wherein the feature of the real object contains a color of the real object,
the feature of the virtual object contains a color of the virtual object, and the display control section calculates the predicted strength of the feeling of delay in display more largely, as the color of the real object and the color of the virtual object become less similar.

(16)

The information processing device of (11), wherein the feature of the real object contains luminance of the real object, the feature of the virtual object contains luminance of the virtual object, and the display control section calculates the predicted strength of the feeling of delay in display more largely, as a difference between the luminance of the real object and the luminance of the virtual object becomes larger.

(17)

The information processing device of (1), wherein the display control section controls display of at least the boundary of the virtual object, on the basis of a motion of a virtual camera calculated from a recognition result of the real space.

(18)

The information processing device of (17), wherein in a case where the motion of the virtual camera exceeds a predetermined motion, the display control section modifies display of at least the boundary of the virtual object.

(19)

An information processing method comprising:

acquiring a position of a virtual object, having been determined on the basis of a position of a virtual camera having been calculated on the basis of recognition result of a real space corresponding to an image captured by an imaging device; and controlling display of at least a boundary of the virtual object, on the basis of the position of the virtual object, and a feature of a real object that resides in the real space.

(20)

A program that functionalizes a computer as an information processing device, the information processing device comprising:

a position acquisition section that acquires a position of a virtual object, having been determined on the basis of a position of a virtual camera having been calculated on the basis of recognition result of a real space corresponding to an image captured by an imaging device; and a display control section that controls display of at least a boundary of the virtual object, on the basis of the position of the virtual object, and a feature of a real object that resides in the real space.

REFERENCE SIGNS LIST

10 INFORMATION PROCESSING DEVICE
111 IMAGING SECTION FOR FIELD-OF-VIEW ANALYSIS
112 SENSOR SECTION
120 CONTROL SECTION
121 REAL SPACE INFORMATION ACQUISITION SECTION
122 REAL OBJECT DETECTION SECTION
123 APPLICATION EXECUTION SECTION
124 RANGING SECTION
125 SELF POSITION ESTIMATION SECTION
126 APPLICATION EXECUTION SECTION
127 POSITION ACQUISITION SECTION
128 DISPLAY CONTROL SECTION
130 STORAGE SECTION
150 DISPLAY SECTION

The invention claimed is:

1. An information processing device, comprising:
a central processing unit (CPU) configured to:
determine a virtual object in a real space based on a recognition result of the real space corresponding to an image captured by an imaging device;
acquire a first position of the virtual object in the real space based on the determination of the virtual object;
calculate a first degree of delay in display of the virtual object based on a feature of a real object in the real space; and
control display of at least a boundary of the virtual object at a second position away from the first position with respect to the real object, wherein
the display of at least the boundary of the virtual object is controlled based on
the acquired first position of the virtual object, and
the calculated first degree of delay in the display of the virtual object is greater than a first value, and
a distance between the acquired first position and the real object is smaller than a second value.

2. The information processing device of claim 1, wherein in a case where the virtual object and the real object are in a first positional relation, the CPU is further configured to control display of at least the boundary of the virtual object in a manner different from a case where the virtual object and the real object are in a second positional relation which is different from the first positional relation.

3. The information processing device of claim 2, wherein in a case where positional relation between the virtual object and the real object is changed from the first positional relation to the second positional relation, in response to a motion of a field of view of a user, the CPU is further configured to modify the display of at least the boundary of the virtual object, and
the user is associated with the information processing device.

4. The information processing device of claim 1, wherein the CPU is further configured to modify a shape of the virtual object based on the first degree of delay in the display of the virtual object is greater than the first value.

5. The information processing device of claim 1, wherein the CPU is further configured to one of give a motion to the virtual object or increase the motion of the virtual object based on the first degree of delay in the display of the virtual object is greater than the first value.

6. The information processing device of claim 1, wherein the CPU is further configured to modify at least one of color or luminance of the virtual object based on the first degree of delay in the display of the virtual object, and
the at least one of the color or the luminance of the virtual object is modified to be similar to at least one of color or luminance of the real object.

7. The information processing device of claim 1, wherein the CPU is further configured to reduce recognizability of the boundary of the virtual object based on the first degree of delay in the display of the virtual object.

8. The information processing device of claim 1, wherein the feature of the real object includes at least one of shape of the real object or motion of the real object.

9. The information processing device of claim 1, wherein
the CPU is further configured to calculate the first degree of delay in the display of the virtual object based on a feature of the virtual object.

10. The information processing device of claim 9, wherein
the feature of the real object includes a position of a straight line that composes the real object,
the feature of the virtual object includes the first position of the virtual object,
the CPU is further configured to calculate the first degree of delay in the display of the virtual object to be greater than a second degree of delay in the display of the virtual object, and
the position of the virtual object and the position of the straight line that composes the real object is closer corresponding to the first degree of delay than the second degree of delay.

11. The information processing device of claim 9, wherein
the feature of the real object includes a direction of a straight line that composes the real object,
the feature of the virtual object includes a direction of a straight line that composes the virtual object,
the CPU is further configured to calculate the first degree of delay in the display of the virtual object to be greater than a second degree of delay in the display of the virtual object, and
an angle between the direction of the straight line that composes the virtual object and the direction of the straight line that composes the real object is smaller corresponding to the first degree of delay than the second degree of delay.

12. The information processing device of claim 9, wherein the feature of the virtual object includes at least one of a shape of the virtual object or motion of the virtual object.

13. The information processing device of claim 9, wherein
the feature of the real object includes a color of the real object,
the feature of the virtual object includes a color of the virtual object,
the CPU is further configured to calculate the first degree of delay in the display of the virtual object to be greater than a second degree of delay in the display of the virtual object, and
the color of the real object and the color of the virtual object is less similar corresponding to the first degree of delay than the second degree of delay.

14. The information processing device of claim 9, wherein
the feature of the real object includes luminance of the real object,
the feature of the virtual object includes luminance of the virtual object,
the CPU is further configured to calculate the first degree of delay in the display of the virtual object to be greater than a second degree of delay in the display of the virtual object, and
a difference between the luminance of the real object and the luminance of the virtual object is larger corresponding to the first degree of delay than the second degree of delay.

15. The information processing device of claim 1, wherein
the CPU is further configured to:
calculate motion of a virtual camera from the recognition result of the real space; and
control display of at least the boundary of the virtual object based on the calculated motion of the virtual camera.

16. The information processing device of claim 15, wherein
the CPU is further configured to modify the display of at least the boundary of the virtual object based on the motion of the virtual camera exceeds a threshold motion value.

17. An information processing method, comprising:
determining a position of a virtual camera based on a recognition result of a real space corresponding to an image captured by an imaging device;
determining a virtual object in the real space based on the determined position of the virtual camera;
acquiring a first position of the virtual object in the real space based on the determination of the virtual object;
calculating a degree of delay in display of the virtual object based on a feature of a real object in the real space; and
controlling display of at least a boundary of the virtual object at a second position away from the first position with respect to the real object, wherein
the display of at least the boundary of the virtual object is controlled based on
the acquired first position of the virtual object, and
the calculated degree of delay in the display of the virtual object is greater than a first value, and
a distance between the acquired first position and the real object is smaller than a second value.

18. A non-transitory computer-readable medium having stored thereon computer-executable instructions which, when executed by a computer, cause the computer to execute operations, the operations comprising:
determining a position of a virtual camera based on a recognition result of a real space corresponding to an image captured by an imaging device;
determining a virtual object in the real space based on the determined position of the virtual camera;
acquiring a first position of the virtual object in the real space based on the determination of virtual object;
calculating a degree of delay in display of the virtual object based on a feature of a real object in the real space; and
controlling display of at least a boundary of the virtual object at a second position away from the first position with respect to the real object, wherein
the display of at least the boundary of the virtual object is controlled based on
the acquired first position of the virtual object, and
the calculated degree of delay in the display of the virtual object being greater than a first value, and
a distance between the acquired first position and the real object is smaller than a second value.

* * * * *